(12) United States Patent
Aciicmez et al.

(10) Patent No.: US 8,578,179 B2
(45) Date of Patent: Nov. 5, 2013

(54) SAFE COMMAND EXECUTION AND ERROR RECOVERY FOR STORAGE DEVICES

(75) Inventors: Onur Aciicmez, San Jose, CA (US);
Xinwen Zhang, San Jose, CA (US)

(73) Assignee: Samsung Electronics Co., Ltd, Suwon (KR)

( * ) Notice: Subject to any disclaimer, the term of this patent is extended or adjusted under 35 U.S.C. 154(b) by 1437 days.

(21) Appl. No.: 11/875,219

(22) Filed: Oct. 19, 2007

(65) Prior Publication Data
US 2009/0106628 A1    Apr. 23, 2009

(51) Int. Cl.
G06F 12/14    (2006.01)
G06F 11/00    (2006.01)
G11C 29/00   (2006.01)

(52) U.S. Cl.
USPC ................ 713/194; 714/38.1; 714/763

(58) Field of Classification Search
USPC .................. 713/194; 714/38.1, 763
See application file for complete search history.

(56) References Cited

U.S. PATENT DOCUMENTS

| | | | | |
|---|---|---|---|---|
| 4,764,863 A * | 8/1988 | Silverthorn et al. | ............ | 714/39 |
| 4,800,563 A * | 1/1989 | Itagaki et al. | .................. | 714/6.1 |
| 5,303,148 A * | 4/1994 | Mattson et al. | .................. | 600/437 |
| 5,363,502 A * | 11/1994 | Kagimasa et al. | ............. | 714/6.1 |
| 5,418,852 A * | 5/1995 | Itami et al. | ....................... | 705/57 |
| 5,931,920 A * | 8/1999 | Ghaffari et al. | ................... | 710/5 |
| 6,088,740 A * | 7/2000 | Ghaffari et al. | ................... | 710/5 |
| 6,105,075 A * | 8/2000 | Ghaffari | ........................... | 710/5 |
| 6,122,738 A * | 9/2000 | Millard | ......................... | 713/187 |
| 6,145,017 A * | 11/2000 | Ghaffari | ........................... | 710/5 |
| 6,343,260 B1 * | 1/2002 | Chew | ............................. | 702/122 |
| 6,389,560 B1 * | 5/2002 | Chew | ............................. | 714/43 |
| 6,480,801 B2 * | 11/2002 | Chew | ............................ | 702/122 |
| 6,498,657 B1 * | 12/2002 | Kuntz et al. | .................. | 358/1.15 |
| 6,581,111 B1 * | 6/2003 | Lakhanpal et al. | .............. | 710/5 |
| 6,587,470 B1 * | 7/2003 | Elliot et al. | .................... | 370/404 |
| 6,757,837 B1 * | 6/2004 | Platt et al. | ................... | 714/38.13 |
| 6,865,652 B1 * | 3/2005 | Pencis et al. | .................. | 711/154 |
| 6,990,612 B2 * | 1/2006 | Dwyer | ......................... | 714/47.1 |
| 7,085,810 B1 * | 8/2006 | Becker | ......................... | 709/206 |
| 7,356,804 B2 * | 4/2008 | Blumenthal et al. | ......... | 717/124 |
| 7,360,206 B1 * | 4/2008 | Hatcher | ........................ | 717/139 |

(Continued)

OTHER PUBLICATIONS

"Cryptographic hash function," Wikipedia, the free encyclopedia, http://en.wikipedia.org/wiki/Message_digest, 8 pages.

(Continued)

Primary Examiner — Joseph D Torres
(74) Attorney, Agent, or Firm — Kenneth L. Sherman, Esq.; Michael Zarrabian, Esq.; Sherman & Zarrabian LLP (57) ABSTRACT

Techniques for execution of commands securely within a storage device are disclosed. Integrity of a command interpreter is verified before allowing it to execute commands within the storage device. The integrity of the commands can also be checked to safeguard against various threats including, for example, malicious attacks, unintentional errors and defects that can adversely affect stored content and execution. Error recovery techniques can be used to reconstruct the command interpreter and/or commands that are found to be defective. In addition, secure techniques can be used to obtain trusted versions of the command interpreter and/or commands from an authenticated external source.

17 Claims, 8 Drawing Sheets

(56) References Cited

U.S. PATENT DOCUMENTS

| | | | |
|---|---|---|---|
| 7,631,198 B2 * | 12/2009 | Thibadeau | 713/193 |
| 7,634,764 B2 * | 12/2009 | Heinz | 717/140 |
| 7,657,756 B2 * | 2/2010 | Hall | 713/189 |
| 2006/0005046 A1 | 1/2006 | Hars | |
| 2006/0259895 A1 | 11/2006 | Thibadeau | |
| 2006/0288237 A1 | 12/2006 | Goodwill et al. | |

OTHER PUBLICATIONS

"Error detection and correction," Wikipedia, the free encyclopedia, http://en.wikipedia.org/wiki/Error_correction_code#Error_correction, 10 pages.

"Hard disk drive," Wikipedia, the free encyclopedia, http://en.wikipedia.org/wiki/Hard_disk, 12 pages.

* cited by examiner

Prior Art

SAFE COMMAND EXECUTION AND ERROR RECOVERY FOR STORAGE DEVICES

BACKGROUND OF THE INVENTION

Conceptually, a computing device (e.g., a computer) can accept content (or information) and manipulate it to obtain or determine a result based on a sequence of instructions (or computer program) that effectively describes how to process the information. Typically, the information is stored in a digital or binary form in a computer readable memory. More complex computers can store content including the computer program itself. A computer program may be invariable and/or built into the computer device as logic circuitry provided, for example, on microprocessors or computer chips. Today, general purpose computers can have both kinds of programming. Given the prevalence of computing devices in modern society, computer storage (or computer memory) used to store content, is often casually referred to as "memory." Storing content (or information retention) is of one the core functions of computing devices. As such, memory is one of the fundamental components of all modern computers and is often coupled with a Central Processing Unit (CPU) to implement the basic Von Neumann computer model which has been used since the 1940s.

Today, numerous types of computing devices are available. These computing devices widely range with respect to size, cost, amount of storage and processing power, from the expensive and powerful servers, relatively cheaper Personal Computers (PC's) and laptops, to more inexpensive microprocessors or computer chips provided in automobiles and household electronic appliances.

In recent years, computing systems and devices have become more portable and mobile. Today, various mobile and handheld computing devices including wireless phones, media players, Personal Digital Assistants (PDA's) are widely available. Generally, a handheld device (also known as handheld computer or simply handheld) can be a pocket-sized computing device, typically utilizing a small visual display screen for user output and a miniaturized keyboard for user input. In the case of a Personal Digital Assistant (PDA), the input and output can be combined into a touch-screen interface. Along with mobile computing devices (e.g., laptops, smartphones), PDAs and media players are becoming increasingly popular.

As suggested above, memory and memory devices are an important part of the computing environments. Disk storage is a general category of computer storage mechanism, in which data is recorded on planar, round and rotating surfaces (disks, discs, or platters). A disk drive is a peripheral device used to read from and write to a disk. Implementations of disk drives include hard disks, floppy disks and optical discs. Today, the term disk storage often refers to hard disk storage. A hard disk drive (HDD), which is commonly referred to as a hard drive, hard disk or fixed disk drive, is typically a non-volatile storage device which stores digitally encoded data on rapidly rotating platters with magnetic surfaces. Strictly speaking, "drive" can refer to a device distinct from its medium, such as a tape drive and its tape, or a floppy disk drive and its floppy disk. Early HDDs had removable media. However, an HDD today is typically a sealed unit with fixed media. HDDs were originally developed for use with more traditional computing systems or computers. However, applications for HDDs have expanded to also include digital video recorders, digital audio players, personal digital assistants, digital cameras, and video game consoles.

Figure 1:
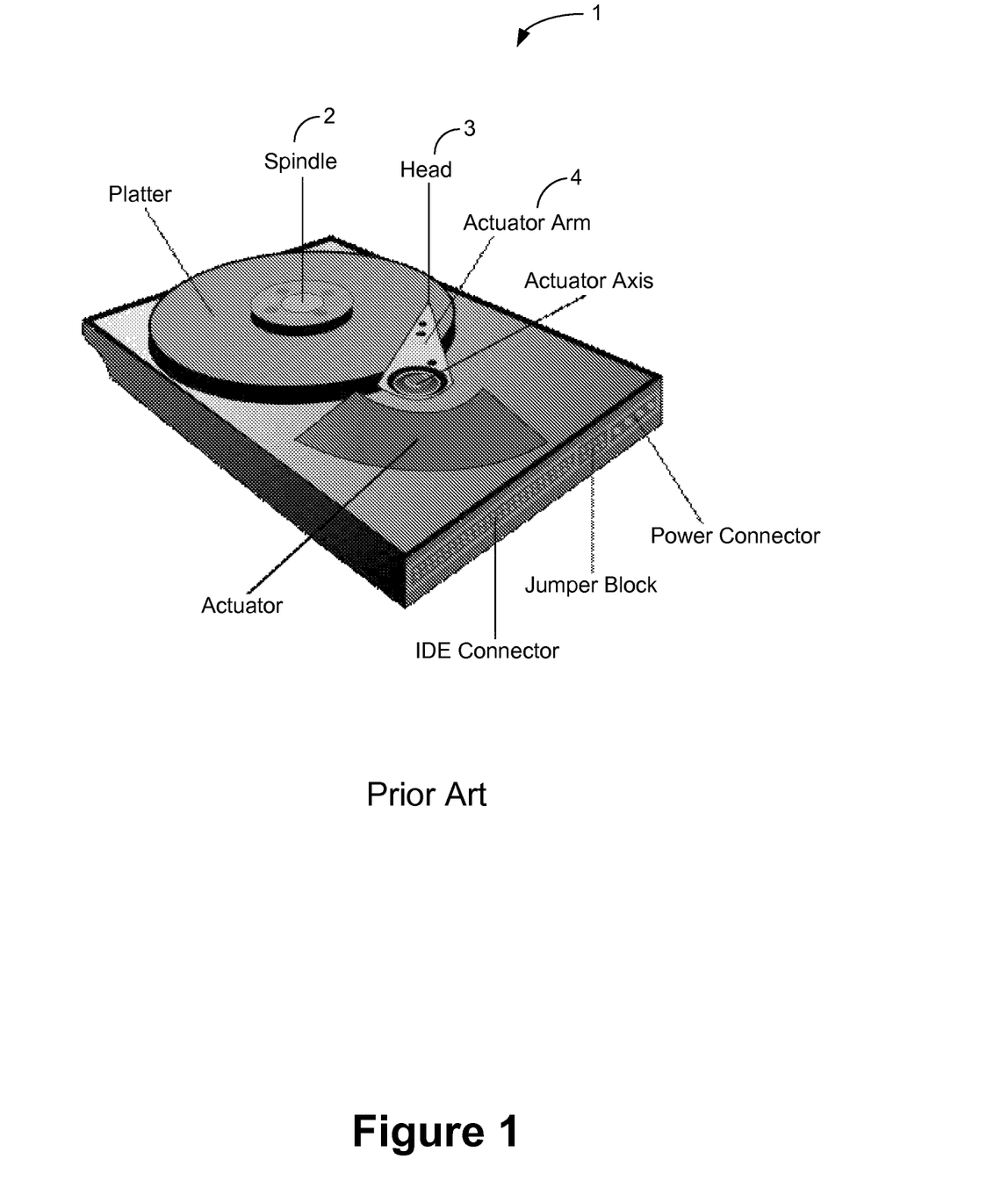
FIG. 1 depicts a conventional storage device (Prior Art).

FIG. 1 depicts a hard disk drive 1 that can store information on one or more rigid, flat, disks. The disks are mounted on a spindle 2, with spaces in between, and a motor on the bottom end of the spindle. To read and write to the surface of the disks, the drive uses a small electromagnet assembly, referred to as a head 3, located on the end of an actuator arm 4. There is one head for each platter surface on the spindle 2. The disks are spun at a very high speed to allow the head 3 to move quickly over the surface of the disk. Towards the other end of the actuator arm 4 is a pivot point, and at the end is a voice coil, which moves the head 3. Above and below each voice coil is a rare earth magnet. This allows the head to move towards the center of the disk or towards the outside, in a radial pattern.

A disk controller can use a digital-to-analog converter to control the flow of electricity through the voice coil(s) located on the actuator arm 4. The voice coil acts as an electromagnet producing a magnetic field that interacts with magnetic fields of the magnet located above and below the voice coil, which causes the voice coil to move the actuator arm 4, and in turn the head located on the opposite end of the actuator arm. So as the voice coil is pushed towards one end, the assembly moves the head towards the center, and when the voice coil is pushed towards the other end, the heads move towards the outside edge of the disk, or the heads are parked. The digital-to-analog converter allows the disk controller to move the head in tiny steps in either direction. The disks are made of a non-magnetic material, usually aluminum or glass, and are coated with a very thin layer of magnetic material. Older disks used iron(III) oxide as the magnetic material, but current disks use a cobalt-based alloy.

Hard disk drives can be sealed to prevent dust and other sources of contamination from interfering with the operation of the hard disks heads. The hard drives are not air tight, but rather utilize an extremely fine air filter, to allow for air inside the hard drive enclosure. The spinning of the disks causes the air to circulate forcing any particulates to become trapped on the filter. The spinning of the disks, also allows the hard disk heads to float above the surface of the disk surface using the same air currents. Using rigid disks and sealing the unit allows much tighter tolerances than in a floppy disk drive. Consequently, hard disk drives can store much more data than floppy disk drives and access and transmit it faster Today, relatively large amount of content can be stored in a portable and easy to access devices such as USB flash drives (or USB flash devices). The content stored on USB flash drive can be easily carried and copied on various computing devices. By way of example, data stored on server computer can be copied on a USB flash drive and taken home and loaded (or copied) on a Personal Computer (PC) and used. The data can be modified on the PC and stored back on the USB flash drive. The USB flash drive can be taken back to work to be used by a computer provided at work or carried to a different city and used by another computer or laptop. The USB flash drive is especially popular today and represents an exemplary advancement in storage technology which has effectively improved portability and mobility of computing systems. As such, USB flash drives will be discussed below.

USB flash drives are generally NAND-type flash memory data storage devices integrated with a USB (universal serial bus) interface. NAND flash architecture was introduced by Toshiba in 1989. NAND flash memories are typically accessed much like block devices such as hard disks or memory cards. The pages are typically 512 or 2,048 bytes in size. Associated with each page are a few bytes (typically 12-16 bytes) that should be used for storage of an error detection and correction checksum. USB flash drives are typically small, lightweight, removable and rewritable. Memory capacities for USB flash Drives currently can range from 32 megabytes up to 64 gigabytes. Capacity is limited only by current flash memory densities, although cost per megabyte may increase rapidly at higher capacities due to the expensive components. USB flash drives offer potential advantages over other portable storage devices, particularly the floppy disk. They are more compact, generally faster, hold more data, and are more reliable (due to both their lack of moving parts, and their more durable design) than floppy disks. These types of drives use the USB mass storage standard, supported natively by modern operating systems such as Windows, Mac OS X, Linux, and Unix.

Generally, a flash drive has a small printed circuit board typically in a plastic or metal casing, making the drive sturdy enough to be carried about in a pocket, as a key fob, or on a lanyard. The USB connector protrudes from the casing, and is usually covered by a removable cap. Most flash drives use a standard type-A USB connection allowing them to be connected directly to a port on a personal computer.

To access the data stored in a flash drive, the drive is typically connected to a computer, either by plugging it into a USB host controller built into the computer, or into a USB hub. Typically, flash drives are active only when plugged into a USB connection and draw all necessary power from the supply provided by that connection. However, some flash drives, especially high-speed drives, may require more power than the limited amount provided by a bus-powered USB hub, such as those built into some computer keyboards or monitors. These drives will not work unless plugged directly into a host controller (i.e., the ports found on the computer itself) or a self-powered hub.

Computing systems and storage devices have improved in recent years. However, security of conventional environments and devices is a major concern. Storage devices are an important component of computing systems. Accordingly, techniques that can improve the security of storage devices would be highly useful.

SUMMARY OF THE INVENTION

Broadly speaking, the invention provides secure storage devices and techniques for execution of commands securely within various storage devices. It will be appreciated that the techniques can safeguard against various threats including, for example, malicious attacks, unintentional errors and defects that can adversely affect stored content and execution. The invention also provides techniques for recovery from corrupted code which can, for example, be caused by a malicious attack, unintentional error or defect.

In accordance with one aspect of the invention, a controller can be provided for a storage device to control the execution of commands within the storage device. In one embodiment, the controller checks the integrity of a command interpreter and only allows the command interpreter to execute commands if it can verify the integrity of the command interpreter. If the integrity of the command controller can be verified, the controller and/or command interpreter can check the integrity of the commands before executing the commands to ensure that the commands have maintained their integrity (i.e., commands have not been corrupted). The controller can also be configured to attempt to reconstruct the command interpreter using error recovery techniques and/or obtain the command from an external source (e.g., a website associated with a trusted manufacturer). In addition, the controller and/or command interpreter can be configured to attempt to reconstruct commands using error recovery techniques and/or obtain the command from an external source.

The invention can be implemented in numerous ways, including, for example, a method, an apparatus, a computer readable medium, and a storage device. Several embodiments of the invention are discussed below.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

As noted in the background section, storage devices have improved in recent years. However, computer security is a general concern for modern computing systems and environments. Security can be enhanced by performing computations within the storage device. More particularly, Storage devices (e.g. disk drives, flash memory devices) can be provided with a processor (or micro-processor) configured to perform computations internally within the storage device. Further, it is possible to provide a set of allowed commands and enforce their proper execution. For example, U.S. Publication No. 2006/0259895, entitled "Protocol scripting language for safe execution in embedded system," filed on May 10, 2005, which is hereby incorporated herein by reference for all purposes, describes a script interpreter adapted to enforce a strict ordering of script execution and terminate and roll back changes associated with the script execution if an interface command invokes a script in violation of the script ordering.

Internally executing commands within storage devices can significantly improve the security of storage devices and thereby the computing systems that they can provide and/or serve. However, it will be appreciated that conventional storage devices are vulnerable to malicious attacks and accidental corruptions because the internal commands and mechanisms provided for execution can themselves be subject to malicious attacks or accidental corruption. In addition, conventional techniques do not provide a secure mechanism for recovery from malicious or accidental corruptions. Accordingly, techniques that can further improve the security of the storage device and would allow error recovery would be highly useful given the importance of storage devices for various computing systems and applications.

Broadly speaking, the invention provides secure storage devices and techniques for execution of commands securely within various storage devices. It will be appreciated that the techniques can safeguard against various threats including, for example, malicious attacks, unintentional errors and defects that can adversely affect stored content and execution. The invention also provides techniques for recovery from corrupted code which can, for example, be caused by a malicious attack, unintentional error or defect.

In accordance with one aspect of the invention, a controller can be provided for a storage device to control the execution of commands within the storage device. In one embodiment, the controller checks the integrity of a command interpreter and only allows the command interpreter to execute commands if it can verify the integrity of the command interpreter. If the integrity of the command controller can be verified, the controller and/or command interpreter can check the integrity of the commands before executing the commands to ensure that the commands have maintained their integrity (i.e., commands have not been corrupted). The controller can also be configured to attempt to reconstruct the command interpreter using error recovery techniques and/or obtain the command from an external source (e.g., a website associated with a trusted manufacturer). In addition, the controller and/or command interpreter can be configured to attempt to reconstruct commands using error recovery techniques and/or obtain the command from an external source.

Embodiments of these aspects of the invention are discussed below with reference to FIGS. 2-6B. However, those skilled in the art will readily appreciate that the detailed description given herein with respect to these figures is for explanatory purposes as the invention extends beyond these limited embodiments.

Figure 2:
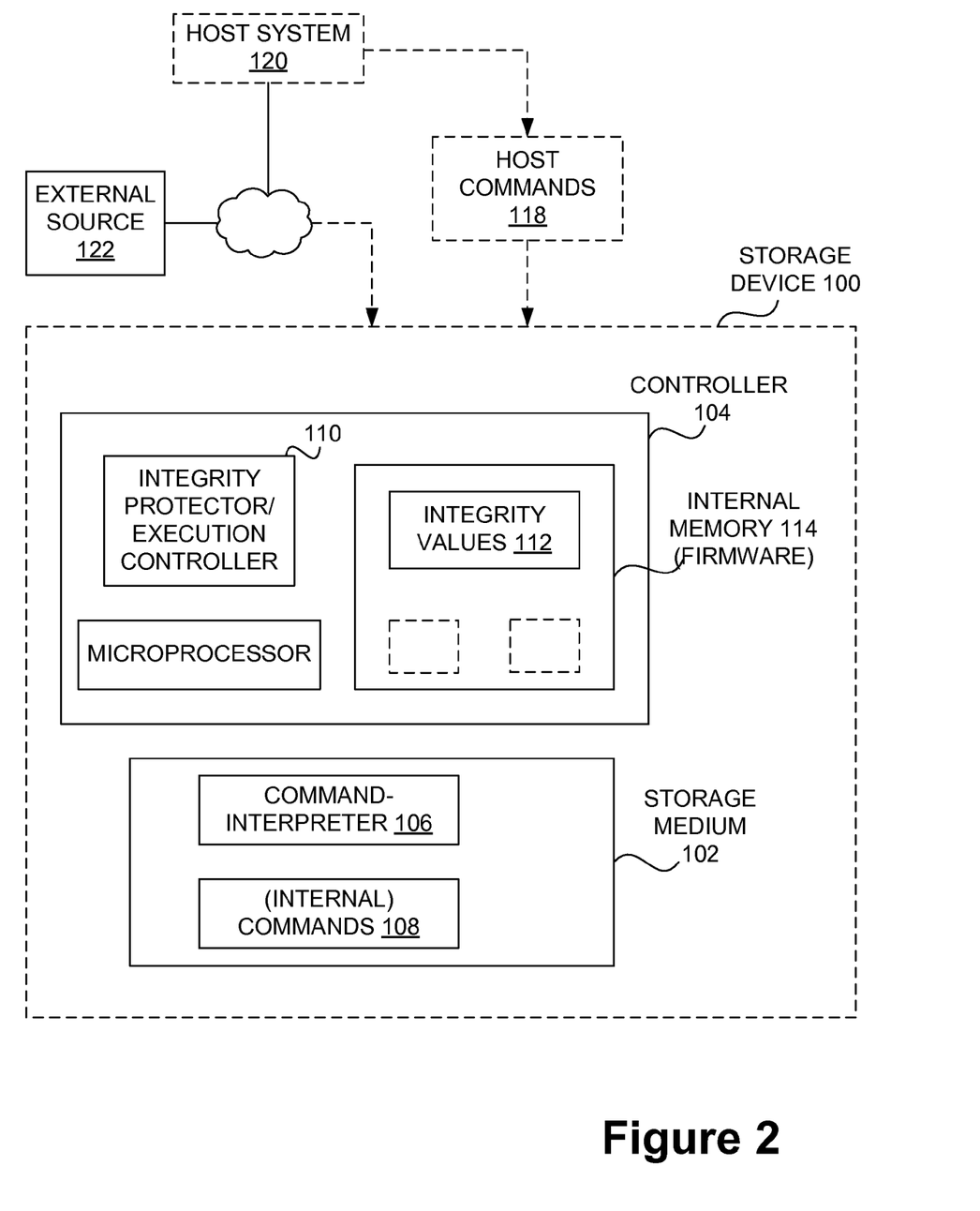
FIG. 2 depicts a storage device in accordance with one embodiment of the invention.

FIG. 2 depicts a storage device 100 in accordance with one embodiment of the invention. Referring to FIG. 2, the storage device 100 includes storage medium 102 and a controller 104. The storage medium 102 can effectively provide memory suitable for storing the command interpreter 106 and commands 108. The command interpreter 106 can execute the commands 108. It will be appreciated that the controller 104 can effectively insure the integrity of the command interpreter 106 and commands 108. Conceptually, an integrity protector/execution controller 110 is effectively provided by the controller 104 to insure that the command interpreter 106 has maintained its integrity before the commands 108 are executed by the storage device 100. In other words, the integrity protector/execution controller 110 can determine whether the command interpreter 106 has maintained its integrity before it allows the command interpreter 106 to execute any of the commands 108. If the integrity of the command interpreter 106 is successfully verified, the integrity protector/execution controller 110 and the command interpreter 106 can determine whether the commands 108 have maintained their integrity before any one of the commands 108 is allowed to be executed.

Generally, one or more integrity values corresponding to the command interpreter 106 or commands 108 can be used to determine whether the command interpreter 106 and/or commands 108 have maintained the integrity. The integrity values 112 represent the values as are trusted (or known) to be valid values. By way of example, the integrity values 112 can represent a message digest of a version of the command interpreter 106 and/or commands 108 trusted (or known) to be valid. As such, the integrity protector/execution controller 110 can calculate the message digest of the command interpreter 106 and/or commands 108 currently stored in the storage medium 102 and compare them to the integrity values 112 which are typically securely stored by the storage device 100. Similarly, the command interpreter 106 can be configured to calculate the current integrity values for the commands 108 and compare them to the expected values stored as integrity values 112. As shown in FIG. 2, the integrity values 112 can, for example, be stored in internal memory (or firmware) 114 of the controller 104. However, it should be noted that the integrity values 112 can be stored in the storage medium 102 (e.g., in a secured and/or protected location). Similarly, the command interpreter 106 and commands 108 are depicted to be stored in storage medium 102. However, it should also be noted that the command interpreter 106 can alternatively be stored in the internal memory 114 of the controller 104.

It should be noted that the integrity values 112 can be secured using, for example, various encryption techniques to, among other things, protect against malicious attacks and unauthorized access. Those skilled in the art will know that various techniques including a public key signature, a root key that effectively provides a unique key and a protected symmetric key can be used to encrypt the integrity values 112. Those skilled in the art will also appreciate that an integrity verification function can be applied to the command interpreter 106 and/or commands 108 in order to effectively check the integrity of the command interpreter 106 and/or internal commands 108. An integrity function can, for example, be applied as described the by U.S. Pat. No. 6,122,738, entitled "COMPUTER FILE INTEGRITY VERIFICATION," which is hereby incorporated by reference herein for all purposes. As such, those skilled in the art will appreciate that a command interpreter can, for example, include a security value (S) that depends on (i) an integrity verification function, (ii) content of the command interpreter, and (iii) a pre-selected residual value (r) not stored in the command interpreter. The integrity verification function can be applied to the command interpreter which includes the security value (S) in order to obtain a result (R). If the result (R) is equal to the pre-selected residual value (r) then the command interpreter is considered to have maintained its integrity.

It should be noted that commands 108 can effectively represent a set of internal commands which map to one or more host commands 118 used by a host system 120. As such, if one or more host commands 118 are received by the storage device 100, the integrity protector/execution controller 110 can effectively map the one or more host commands 118 to one or more internal commands 108. In addition, the integrity protector/execution controller 110 can verify that the host commands 118 are valid and in a proper form (e.g., provided with valid parameters).

It should also be noted that the internal commands 108 can be implemented as scripts similar, for example, to that scripts described in the U.S. Publication No, 2006/0259895, entitled "Protocol scripting language for safe execution in embedded system," filed on May 10, 2005. As such, the integrity protector/execution controller 110 can also be configured to ensure that scripts are executed in a proper order and yield the expected results. The execution sequence can be effectively rolled back to a state prior to the execution of the script if a deviation from the expected order is detected. The integrity protector/execution controller 110 can determine that the command interpreter 106 has maintained its integrity before allowing the command interpreter 106 to be executed (i.e., allow the command interpreter 106 to execute any commands). If the integrity protector/execution controller 110 determines that the command interpreter 106 has maintained its integrity, it can effectively load the command interpreter 106 into memory 114 for execution. It should be noted that the command interpreter 106 can be configured to check the validity of the host commands 118. Also, the command interpreter 106 can effectively control the execution of the corresponding internal commands 108 after its integrity has been verified. As such, the command interpreter 106 can be configured to check the validity of the host commands 118 as well as the integrity of the internal commands 108 corresponding to the host command 118. If the command interpreter 106 determines that one or more of the internal commands 108 have not maintained their integrity, the commands are not executed. Generally, the controller 104 can be configured to initially check the integrity of the command interpreter. Thereafter, the integrity of the commands can be verified by the controller 104 and/or the command interpreter 106.

It should be noted that the controller 104 can also be configured to perform error recovery operations if it is determined that the integrity of the command interpreter 106 and/or commands 108 have compromised. As such, if the integrity protector/execution controller 110 determines that the command interpreter 106 has not maintained its integrity, it can initiate various error recovery mechanisms. Those skilled in the art will readily appreciate that the command interpreter 106 can be integrated with error recovery code to allow error recovery using an error recovery method. In general, error recovery code integrated with content can be used in an attempt to reconstruct the original content. As such, error recovery code integrated with the command interpreter 106 can be utilized in an attempt to reconstruct the original executable content of the command interpreter 106. The reconstructed content can then be checked using, for example, the integrity values 112 to ensure that the error recovery mechanism has successfully reconstructed the original content of the command interpreter 106. Similarly, error recovery code and various error recovery techniques and methods can be used in an attempt to recover the commands 108. It will be appreciated that the controller 104, command interpreter 106 and/or a specific error recovery component (not shown) can be configured to recover the commands 108. If error recovery attempts are not successful, the integrity protector/execution controller 110 can attempt to obtain a valid version of the command interpreter 106 and/or commands 108 from an external source 122. The command interpreter 106 and/or another component (not shown) can be configured to obtain the commands 108. Generally, the content obtained from the external source 122 can be authenticated/verified by the integrity protector/execution controller 110.

Those skilled in the art will readily appreciate that the integrity protector/execution controller 110 can be provided in the internal memory/firmware 114 of the controller 104. It will also be appreciated that the protector/execution controller 110 need not be provided as a part of the controller 104. In general, the integrity protector/execution controller 110 can be provided as a computing component for a storage device 200. As such, the integrity protector/execution controller 110 can, for example, be provided as a separate microchip that includes a microprocessor and code embedded in firmware. As another example, the integrity protector/execution controller 110 can be provided as a computer readable medium and/or a tangible medium storing executable instructions (e.g., firmware, secured memory) which is accessed by the controller and/or another computing component to effectively execute the instructions.

Figure 3:
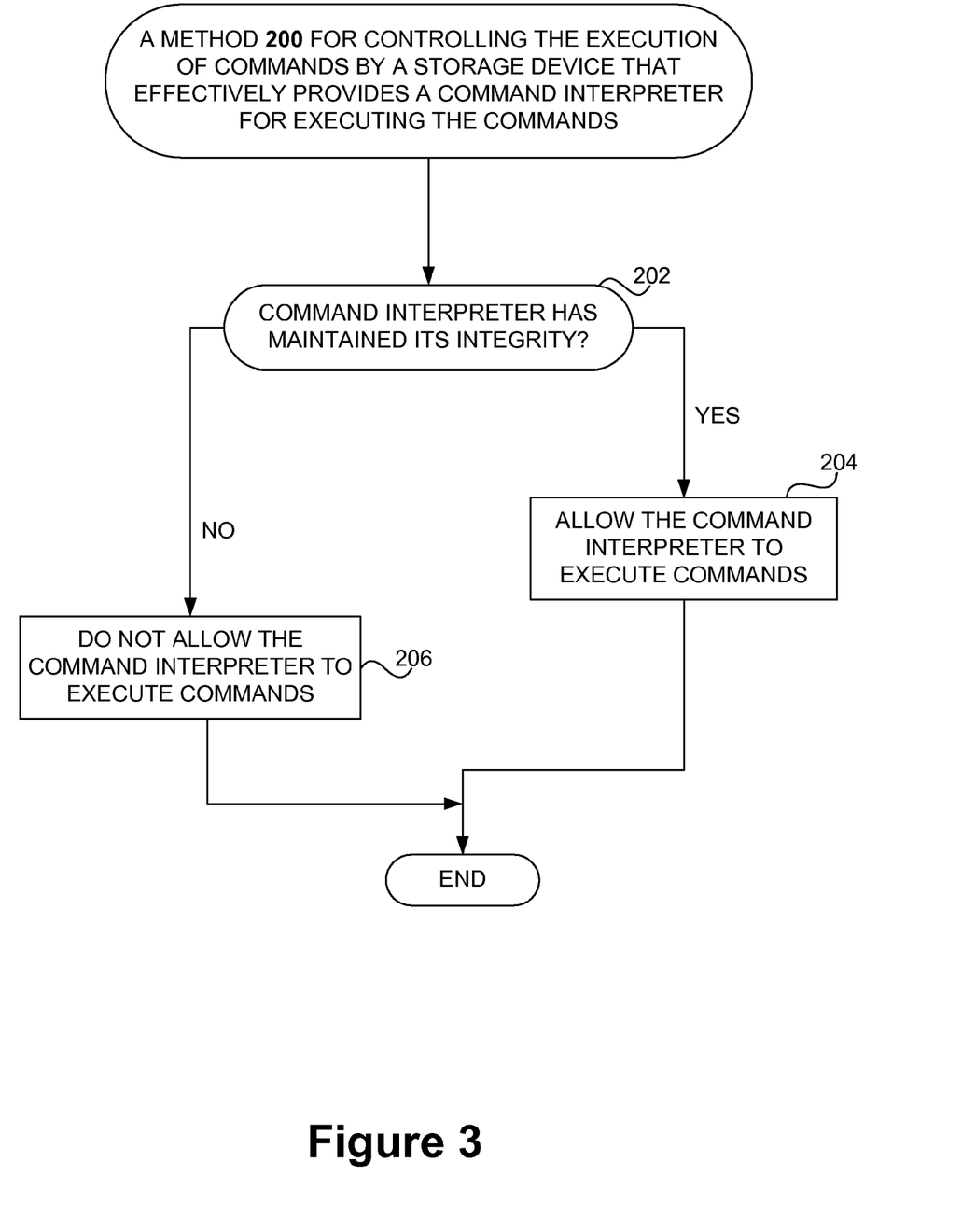
FIG. 3 depicts a method for controlling execution of commands by a storage device in accordance with one embodiment of the invention.

FIG. 3 depicts a method 200 for controlling execution of commands by a storage device in accordance with one embodiment of the invention. The storage device effectively provides a command interpreter for executing a set of commands that can be stored and internally executed within the storage device. The method 200 can, for example, be used by the storage device 100 shown in FIG. 2. Initially, it is determined (202) whether the command interpreter has maintained its integrity. Generally, the determination (202) can be triggered by an event or condition (e.g., start up, receiving a command from host computer system). In any case, if it is determined (202) that the command interpreter has maintained its integrity, the command interpreter is allowed (204) to execute one or more commands within the storage device and the method 200 ends. However, if it is determined (202) that the command interpreter has not maintained its integrity, the command interpreter is not allowed (206) to execute any commands within the storage device and the method 200 ends.

Figure 4:
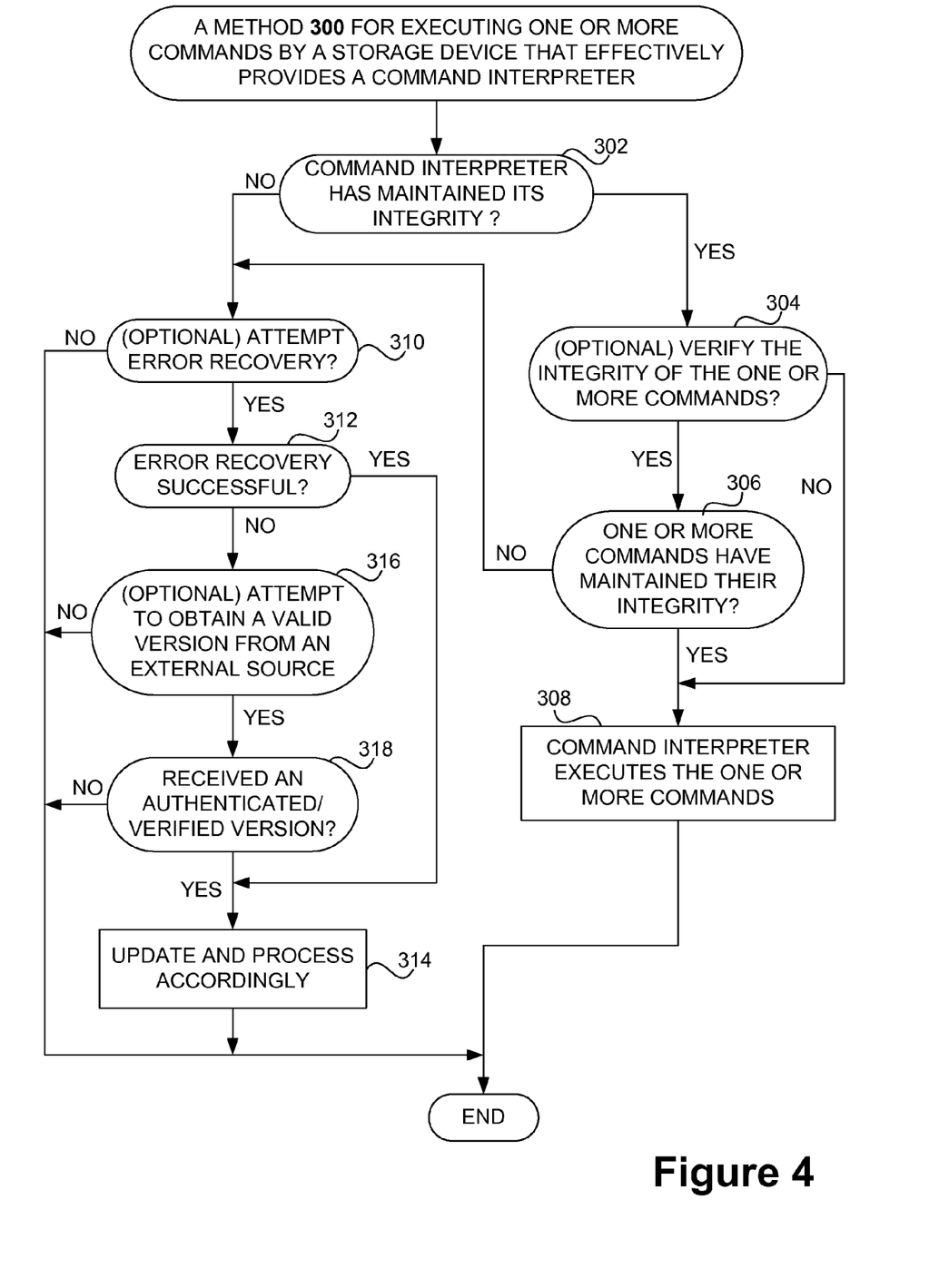
FIG. 4 depicts a method for executing one or more commands by a storage device in accordance with another embodiment of the invention.

FIG. 4 depicts a method 300 for executing one or more commands by a storage device in accordance with another embodiment of the invention. Again, it should be noted that the storage device effectively provides a command interpreter for executing one or more commands that can be internally stored and executed within the storage device. Initially, it is determined (302) whether the command interpreter has maintained its integrity. If it is determined (302) that the command interpreter has maintained its integrity, it is determined (304) whether to verify the integrity of the one or more commands that can and/or are to be executed by the command interpreter. Those skilled in the art will readily appreciate that the determination 304 can, for example, represent a design and/or configuration choice or it can be a determination actually made based on one or more criteria (e.g., security level desired, the time since last verification was made). Accordingly, if it is determined (304) to verify the integrity of the one or more commands, the integrity of one or more commands are effectively verified (306). If it is determined (306) that one or more commands have maintained their integrity, the command interpreter executes (308) the one or more commands. It should be noted that if it is determined (304) not to verify the integrity of the one or more commands, the method 300 directly proceed to execute (308) the one or more commands and the method 300 ends.

On the other hand, if it is determined (306) that the one or more commands have not maintained their integrity, or it is determined (302) that the command interpreter has not maintained its integrity, it is determined (310) whether to attempt error recovery. In effect, it can be determined (310) whether to attempt to reconstruct the command interpreter or one or more commands that may have been maliciously or accidentally corrupted. The determination (310) can also represent design and/or configuration choice, or can actually be made based on one or more criteria. If it is determined (310) not to attempt error recovery, the method 300 ends.

However, if it is determined (310) to attempt error recovery, error recovery is attempted and subsequently it is determined whether the error recovery has been successful (312). If it is determined (312) that the error recovery has been successful, the content of the command interpreter and/or one or more commands considered to be corrupted are updated and the method 300 can proceed in a similar manner to process the one or more commands (314). On the other hand, if it is determined (312) that the error recovery was not successful, it can be determined (316) whether to attempt to obtain a valid version of the command interpreter and/or one or more commands from an external source. If it is determined (316) not to obtain a valid version from an external source, the method 300 ends. However if it is determined (316) to attempt to obtain a valid version from an external source, it is determined (318) whether an authenticated/verified version of the content of the command interpreter and/or one or more commands are received. If it is determined (318) that the authenticated/verified version of the content is not received, the method 300 ends. However, if it is determined (318) that the authenticated/verified version of the content is received, content is updated and the method 300 proceeds in a similar manner as described above (314) and one or more commands can be executed (308) after appropriate integrity checks have been made.

Figure 5A:
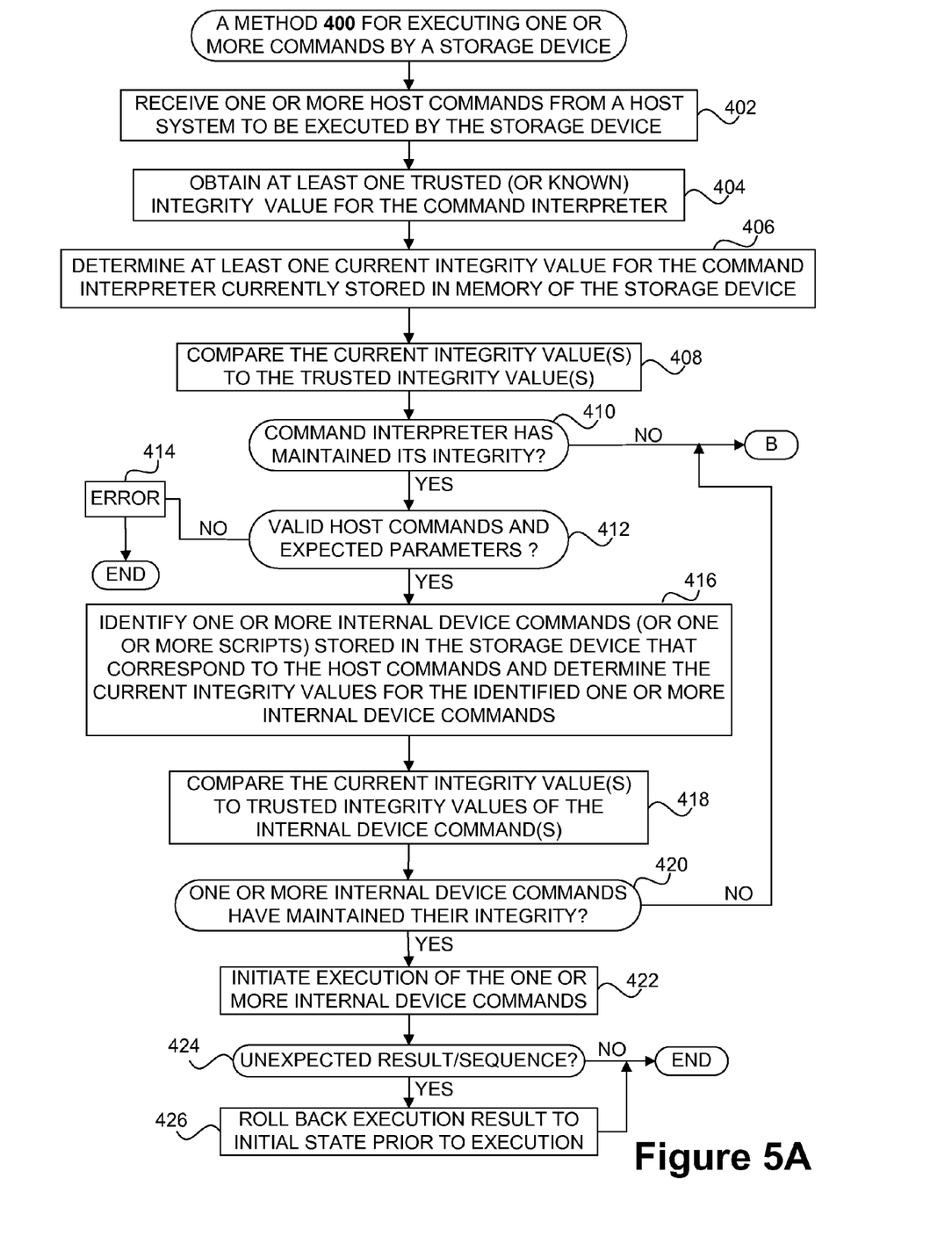
FIG. 5A depicts a method for executing one or more commands by a storage device in accordance with yet another embodiment of the invention.

FIG. 5A depicts a method 400 for executing one or more commands by a storage device in accordance with yet another embodiment of the invention. Initially, one or more host commands are received (402) from a host system. The one or more host commands are to be executed within the storage device. Next, at least one trusted (or known) integrity value is obtained (404) for a command interpreter that can execute commands within the storage device. The trusted integrity value can be secured, for example, by using encryption techniques. Thereafter, at least one current integrity value for the command interpreter is determined (406). Typically, the command interpreter is stored within the memory of the storage device. The current integrity value (or values) can be compared to the trusted integrity values to determine (410) whether the command interpreter has maintained its integrity. If it is determined (410) that the command interpreter has not maintained its integrity, the method 400 can proceed to perform error recovery (depicted in FIG. 5B). However, if it is determined (410) that the command interpreter has maintained its integrity, it is determined (412) whether the host commands are valid and include expected command parameters. It should be noted that this determination (412) can be effectively performed by the command interpreter after the integrity of the command interpreter has been verified (410). If it is determined (412) that the host commands are not valid or do not include expected command parameters, an error can be output (414) and the method 400 ends.

However, if it is determined (412) that valid host commands and expected command parameters are provided, one or more internal device commands (e.g., one or more scripts) stored in the storage device corresponding to the one or more host commands are identified (416). In addition, the current integrity values for the identified internal device commands are determined (416). Subsequently, the current integrity values are compared (418) to the trusted integrity values which can be securely stored in the storage device. Accordingly, it is determined (420) whether the one or more internal device commands have maintained their integrity. If it is determined (420) that the one or more internal commands have not maintained their integrity, the method 400 can proceed to perform error recovery (shown in FIG. 5B). On the other hand, if it is determined (420) that the one or more internal device commands have maintained their integrity, execution of the one or more internal commands is initiated (422). Subsequently, it is determined (424) whether the execution has produced unexpected results or an unexpected sequence of commands has been executed. As a result, the execution can be effectively rolled back to end an initial state prior to execution of the one or more internal device commands (or scripts), and the method 400 ends. On the other hand, if it is determined (424) that the execution of the one or more internal commands has not resulted in an unexpected result or sequence, the execution result is not rolled back and the one or more commands are effectively executed before the method 400 ends.

Figure 5B:
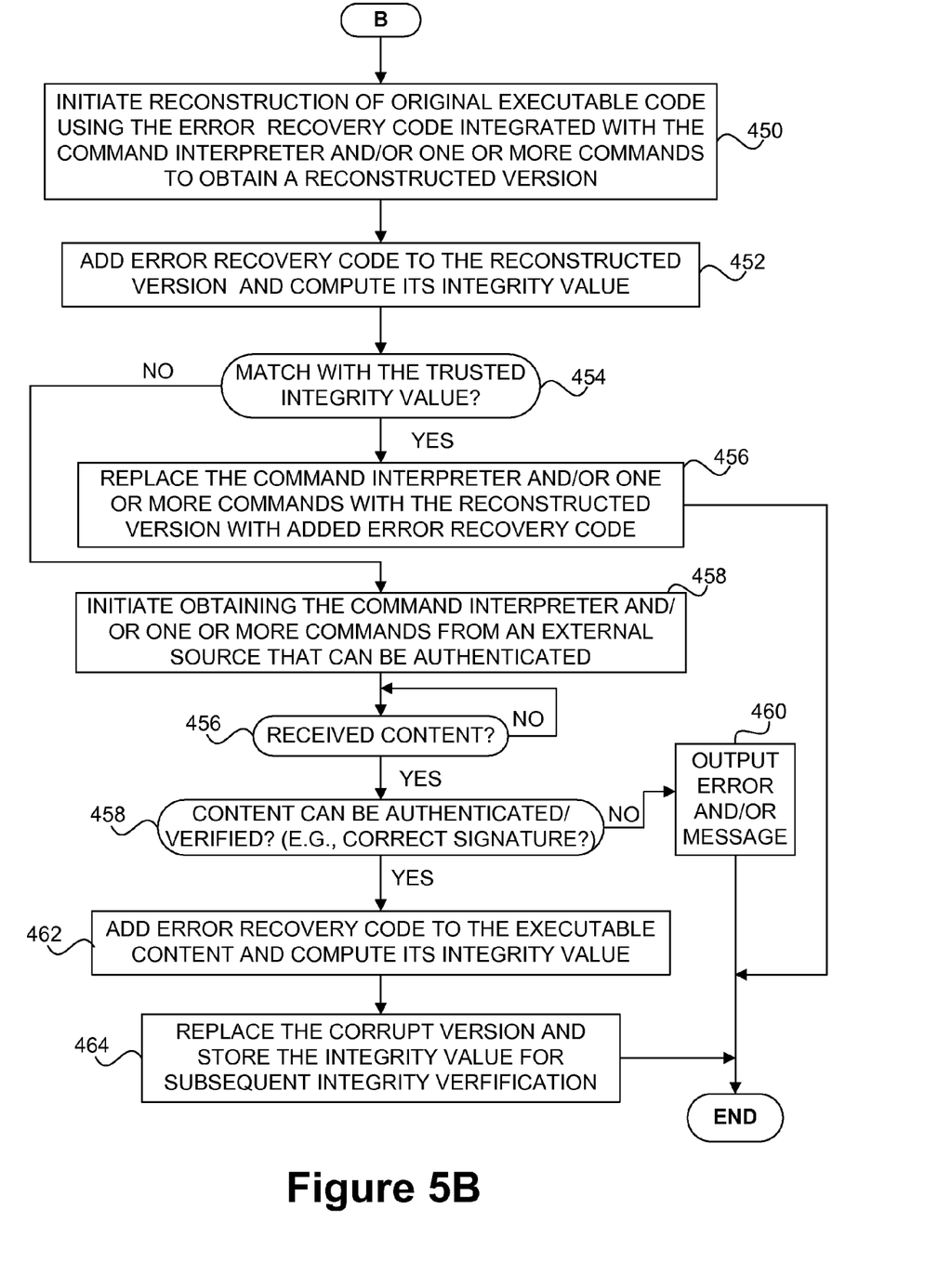
FIG. 5B depicts another error recovery method in accordance with another embodiment of the invention.

FIG. 5B depicts another error recovery method in accordance with another embodiment of the invention. Initially, reconstruction of original executable code (or content) is initiated 450 using error recovery code integrated with the command interpreter or one or more commands depending on which content that has been corrupted. As a result, a reconstructed version of the command interpreter and/or one or more commands is obtained (450). Next, error recovery code is added to the reconstructed version and integrity value of the resulting combination is computed (452). Subsequently, it is determined 454 whether the computed integrity value matches the trusted integrity value. The trusted integrity values are typically securely stored in the storage device. If it is determined (454) that the computed integrity values match the trusted integrity values, the command interpreter and/or one or more commands can to be effectively replaced (456) with the versions which have been reconstructed using error recovery techniques. It should be noted that additional error recovery code can be added (456) to the reconstructed version. On the other hand, if it is determined (454) that the computed integrity value does not match the reconstructed integrity value, an attempt is made to obtain the command interpreter and/or one or more commands from an external source that can be authenticated. The external source can, for example, be website of a manufacture or another entity trusted to provide valid versions of the command interpreter and/or commands as needed. Accordingly, if it is determined (456) that the content is received, it is determined (458) whether the content can be authenticated/verified. By way of example, it can be determined (458) whether the command interpreter and/or one or more commands are provided with correct signatures. If it is determined (458) that the content obtained from the external source cannot be authenticated or verified, an error message can be output (460). However, if it is determined (458) that the content can be authenticated/verified, error recovery code can be effectively added to the content and the integrity value of the resulting combination can be computed (462). Thereafter, the corrupt version of the command interpreter and/or one or more commands can be replaced and stored 464 along with the computed integrity values. The integrity values can subsequently be used to verify the integrity of the command interpreter and/or one or more commands as needed.

In the view of the foregoing, those skilled in the art will readily appreciate that numerous techniques can be used to verify the integrity of executable content. In addition, the executable content can be provided in a manner that allows recovering from error and malicious attacks.

Figure 6A:
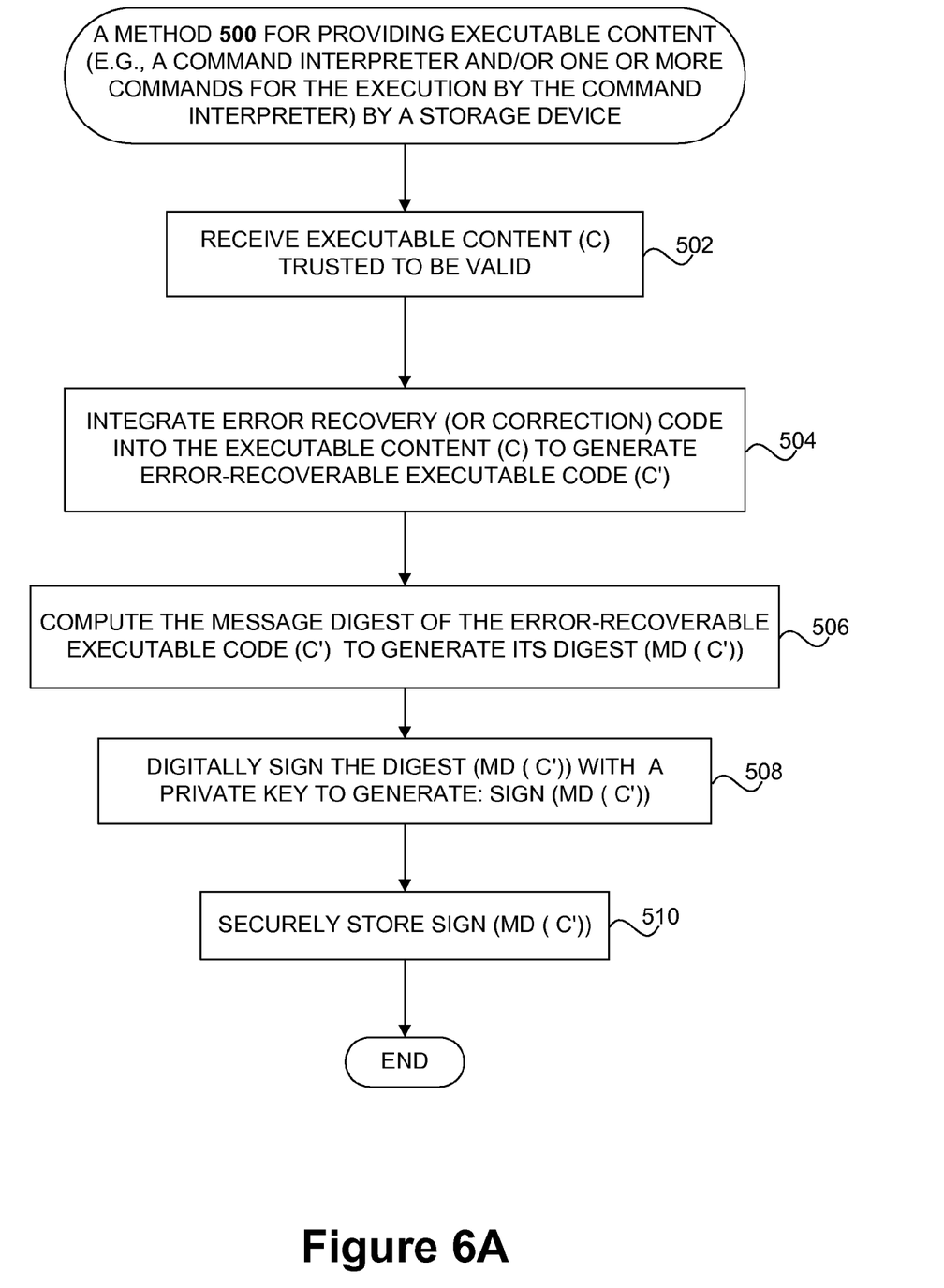
FIG. 6A depicts a method for providing executable content (e.g., a command interpreter, one or more internal command devices) by a storage device in accordance with one embodiment of the invention.
Figure 6B:
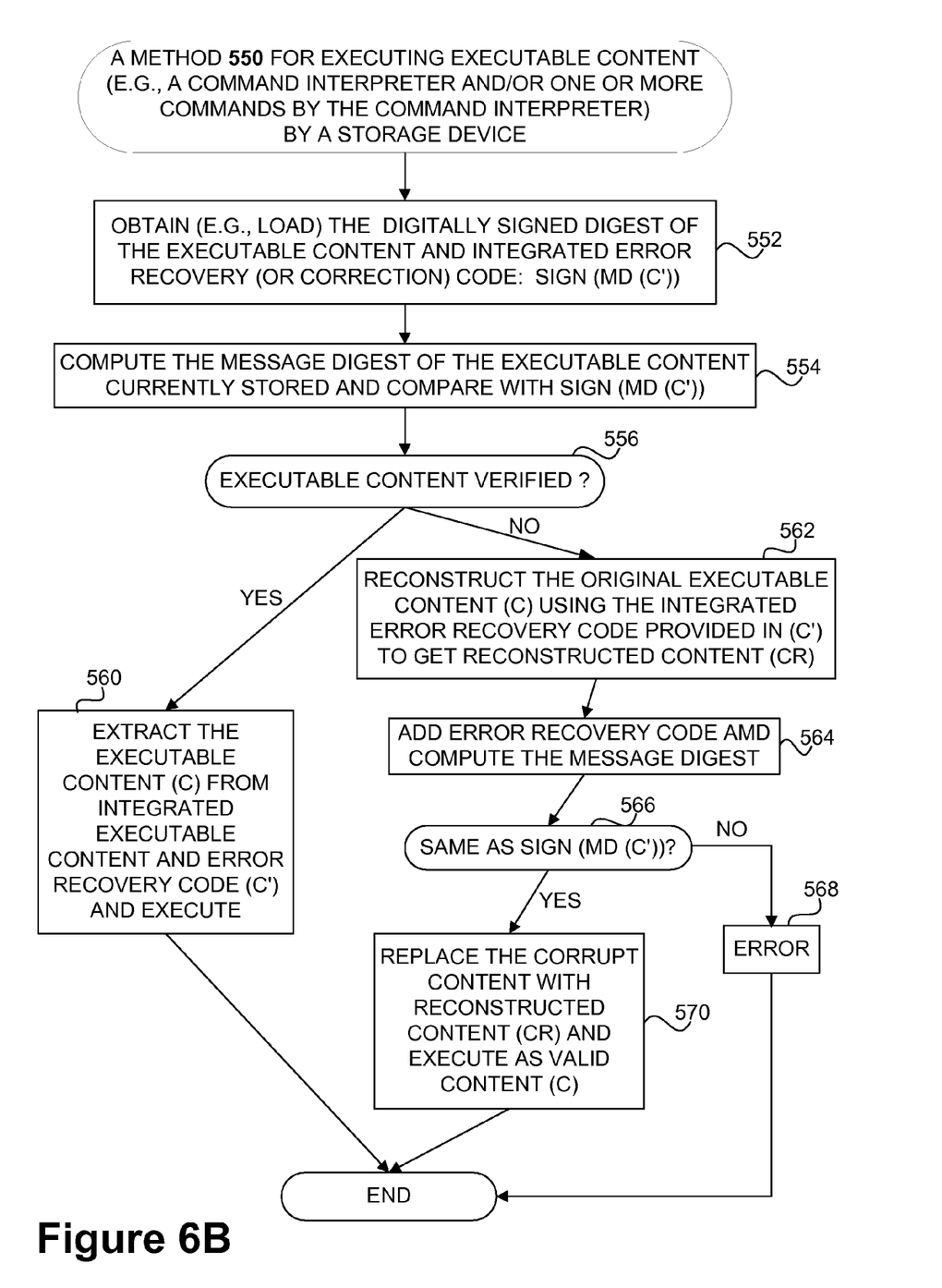
FIG. 6B depicts a method for executing executable content by a storage device in accordance one embodiment of the invention.

To further elaborate, FIGS. 6A and 6B depict exemplary methods for providing and executing content within a storage device in accordance with embodiments of the invention. More particularly, FIG. 5A depicts a method 500 for providing executable content (e.g., a command interpreter, one or more internal device command) by a storage device in accordance with one embodiment of the invention. Initially, executable content (C) is received (502). The executable content (C) is trusted to be valid and is typically received from a trusted and/or authenticated entity. Next, error recovery code (error correction code) is integrated (504) into the executable content (C) to generate error-recoverable executable code (C'). Subsequently, the method digest of the error-recoverable executable code (C') is computed (506) to generate its digest (MD (C')). Subsequently, the digest (MD (C')) is digitally signed (508) with a primary key to generate a sign version, namely: "SIGN (MD (C'))". Finally, the digitally signed digest which includes the error-recoverable executable code (C') is securely stored within the storage device and the method 500 ends.

FIG. 6B depicts a method 550 for executing executable content by a storage device in accordance one embodiment of the invention. The executable content can, for example, be a command interpreter and/or one or more commands that can be executed by the command interpreter. Initially, the digitally signed digest of an executable content is obtained (552). The digitally signed digest of an executable content (e.g., a command interpreter, command) is represented as SIGN (MD (C')) in the previous Figure (FIG. 6A). As noted above, the executable content can include error recovery code. The digitally signed digest can be generated (see FIG. 6A) and stored for subsequent use. As such, the digitally signed digest of the executable content and integrated error recovery code: "SIGN (MD (C'))" can, for example, be loaded into the internal memory of a controller provided for the storage device. Next, the message digest of the executable content currently stored in the storage device is computed (554) and compared with SIGN (MD (C')) in order to verify the integrity of the executable content currently stored in the storage device. If it is determined (556) that the executable content can be verified, (i.e. the executable content has maintained its integrity), the executable content (C) is extracted (560) from the combination of the extractable content and integrated error recovery code (C'). In other words, the original executable content is effectively extracted from the error recovery code and executed (560). On the other hand, if it is determined (556) that the executable content has not maintained its integrity, the original executable content (C) is reconstructed using the integrated error recovery code provided in (C') to get the reconstructed content (CR).

Next, error recovery code is added (564) to the reconstructed content (CR) and the message digest of the resulting combination is computed (564). Subsequently, it is determined (566) whether the message digest of the reconstructed content (CR) is the same as that stored for the original content, namely, SIGN (MD (C')). If it is determined (566) that the computed digest is not the same as expected, namely, the digitally signed digest of the executable content trusted to be valid, an error is output (568) and the method 550 ends. On the other hand, if it is determined (566) that the message digest is the same, the error recovery is effectively deemed successful in obtaining the original version of the executable content. Accordingly, the corrupt content can be replaced (570) with the reconstructed content (CR) and integrated error recovery code for future use. The executable content can be executed as needed before the method 550 ends.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A storage device, comprising:
   a storage medium for storing data;
   a controller configured for and/or capable of:
   providing a command interpreter for execution of one or more commands within said storage device;
   determining whether said command interpreter has maintained its integrity before allowing said command interpreter to execute said one or more commands; and
   allowing said command interpreter to execute said one or more commands when said controller determines that said command interpreter has maintained its integrity;
   wherein said controller is further configured for and/or capable of:
   attempting to reconstruct said command interpreter using an error recovery mechanism that uses error recovery code integrated with executable content of said command interpreter when said controller determines that said command interpreter has not maintained its integrity; and
   attempting to obtain a valid version of said command interpreter from an external source when said attempting to reconstruct said command interpreter fails to reconstruct said command interpreter.

2. The storage device of claim 1, wherein said controller and/or command interpreter are further configured for and/or capable of:
   attempting to reconstruct said one or more commands using an error recovery mechanism when it is determined that said one or more commands have not maintained their integrity; and
   attempting to obtain a valid version of said one or more commands from an external source when it is determined that said one or more commands have not maintained their integrity.

3. The storage device of claim 1, wherein said storage device includes one or more of the following:
   a hard disk drive, a flash drive, and optical drive, a non-volatile memory device, a volatile memory device.

4. The storage device of claim 1, wherein said storage device is a hard disk drive that can be configured to communicate with a host system.

5. A method of controlling the execution of one or more commands by a storage device that effectively provides a command interpreter for execution of said one or more commands, said method comprising:
   determining whether a command interpreter has maintained its integrity before allowing said command interpreter to execute said one or more commands;
   allowing said command interpreter to execute one or more commands when said determining determines that said command interpreter has maintained its integrity;
   wherein said method further comprises:
   attempting to reconstruct said command interpreter using an error recovery mechanism that uses error recovery code integrated with executable content of said command interpreter when determining determines that said command interpreter has not maintained its integrity; and
   attempting to reconstruct said one or more commands using an error recovery mechanism when determining determines that said one or more commands have not maintained their integrity.

6. The method of claim 5, wherein said method further comprises:
   attempting to obtain a valid version of said command interpreter from an external source when said attempting to reconstruct said command interpreter fails to reconstruct said command interpreter; and
   attempting to obtain a valid version of said one or more commands from an external source when said attempting to reconstruct said one or more commands fails to reconstruct said one or more commands.

7. The method of claim 6, wherein said method further comprises:
obtaining a signed version of said command interpreter that includes error recovery code; and
determining based on a signature of said signed version of said command interpreter whether said signed version is a valid version of said command interpreter.

8. A method of controlling the execution of one or more commands by a storage device that effectively provides a command interpreter for execution of said one or more commands, said method comprising:
determining whether a command interpreter has maintained its integrity before allowing said command interpreter to execute said one or more commands;
allowing said command interpreter to execute one or more commands when said determining determines that said command interpreter has maintained its integrity;
wherein said determining of whether said command interpreter has maintained its integrity comprises:
obtaining at least one known integrity value for said command interpreter;
determining at least one current integrity value for said command interpreter;
comparing said at least one known integrity value to said at least one current integrity value; and
determining based on said comparing whether said command interpreter has maintained its integrity;
wherein said known integrity value is a signed known message digest of said command interpreter.

9. The method of claim 8, wherein said known integrity value is a signed known message digest of executable content of said command interpreter and error recovery code which has been incorporated with said executable content of said command interpreter.

10. A method of controlling the execution of one or more commands by a storage device that effectively provides a command interpreter for execution of said one or more commands, said method comprising:
determining whether a command interpreter has maintained its integrity before allowing said command interpreter to execute said one or more commands;
allowing said command interpreter to execute one or more commands when said determining determines that said command interpreter has maintained its integrity;
wherein said method comprises:
obtaining a current version of said command interpreter from memory of said storage device;
computing the message digest of said current version of said command interpreter;
comparing said message digest of said current version of said command interpreter to said signed message digest of said command interpreter;
extracting executable content of said command interpreter for execution when said comparing determining that said message digest of said current version of said command interpreter is equal to said signed message digest of said command interpreter;
attempting to reconstruct said executable content of said command interpreter using an error recovery technique that utilizes error recovery code incorporated with said executable content of said command interpreter;
incorporating said error recovery code into a reconstructed content of said command interpreter to generate a reconstructed command interpreter when said attempting to reconstruct said executable content;
computing the message digest of said reconstructed command interpreter; and
comparing said message digest of said reconstructed command interpreter to said signed known message digest to determine whether said command interpreter has been correctly reconstructed.

11. The method of claim 8, wherein said known integrity value and/or current integrity value are secured and/or protected against unauthorized access by one or more of the following:
storing said known integrity value and/or current integrity value in internal memory and/or secured memory; and
encrypting said known integrity value and/or current integrity values using one or more of the following: public key signature algorithm, a root key algorithm using a unique and protected symmetric key, a private key, a pair of public and private keys.

12. A non-transitory storage medium storing executable instructions for effectively controlling execution of one or more commands by a storage device, said non-transitory storage medium comprising:
executable instructions for determining whether a command interpreter has maintained its integrity before allowing said command interpreter to execute said one or more commands;
executable instructions for allowing said command interpreter to execute one or more commands when said determining determines that said command interpreter has maintained its integrity;
wherein said determining of whether said command interpreter has maintained its integrity comprises:
obtaining at least one known integrity value for said command interpreter;
determining at least one current integrity value for said command interpreter;
comparing said at least one known integrity value to said at least one current integrity value; and
determining based on said comparing whether said command interpreter has maintained its integrity;
wherein said known integrity value is a signed known message digest of said command interpreter.

13. The non-transitory storage medium of claim 12, wherein said non-transitory storage medium further comprises:
executable instructions for determining whether said one or more commands have maintained their integrity; and
executable instructions for executing said one or more commands only when said determining determines that said one or more commands have maintained their integrity.

14. A non-transitory storage medium storing executable instructions for effectively controlling execution of one or more commands by a storage device, said non-transitory storage medium comprising:
executable instructions for determining, based on a comparison of current integrity values for the command interpreter to expected integrity values whether a command interpreter has maintained its integrity before allowing said command interpreter to execute said one or more commands;
executable instructions for allowing said command interpreter to execute one or more commands by only when said determining determines that said command interpreter has maintained its integrity;

wherein said non-transitory storage medium further comprises:
  executable instructions for attempting to reconstruct said command interpreter using an error recovery mechanism that uses error recovery code integrated with executable content of said command interpreter when determining determines that said command interpreter has not maintained its integrity; and
  executable instructions for attempting to reconstruct said one or more commands using an error recovery mechanism when said determining determines that said one or more commands have not maintained their integrity.

15. The non-transitory storage medium of claim 14, wherein said non-transitory storage medium further comprises:
  executable instructions for attempting to obtain a valid version of said command interpreter from an external source when said attempting to reconstruct said command interpreter fails to reconstruct said command interpreter;
  executable instructions for attempting to obtain a valid version of said one or more commands from an external source when said attempting to reconstruct said one or more commands fails to reconstruct said one or more commands; and
  executable instructions for initiating error recovery operations in response to said controller determining that said command interpreter has not maintained its integrity.

16. A computing component for a storage device, wherein said storage device can use a command interpreter to execute one or more commands internally within said storage device, wherein said controller is configured for and/or capable of:
  determining, based on a comparison of current integrity values for the command interpreter to expected integrity values, whether said command interpreter has maintained its integrity before allowing said command interpreter to execute said one or more commands internally within said storage device; and
  allowing said command interpreter to execute said one or more commands within said storage device when said controller determines that said command interpreter has maintained its integrity;
wherein said controller is further configured for and/or capable of:
  attempting to reconstruct said command interpreter using an error recovery mechanism that uses error recovery code integrated with executable content of said command interpreter when said controller determines that said command interpreter has not maintained its integrity; and
  attempting to obtain a valid version of said command interpreter from an external source when said attempting to reconstruct said command interpreter fails to reconstruct said command interpreter.

17. A computing component for a storage device, wherein said storage device can use a command interpreter to execute one or more commands internally within said storage device, wherein said controller is configured for and/or capable of:
  determining whether a command interpreter has maintained its integrity before allowing said command interpreter to execute said one or more commands;
  allowing said command interpreter to execute one or more commands when said determining determines that said command interpreter has maintained its integrity;
wherein said determining of whether said command interpreter has maintained its integrity comprises:
  obtaining at least one known integrity value for said command interpreter; determining at least one current integrity value for said command interpreter;
  comparing said at least one known integrity value to said at least one current integrity value; and
  determining based on said comparing whether said command interpreter has maintained its integrity;
wherein said known integrity value is a signed known message digest of said command interpreter.

* * * * *